US009361112B2

(12) United States Patent
Demongeot et al.

(10) Patent No.: US 9,361,112 B2
(45) Date of Patent: Jun. 7, 2016

(54) RETURN ADDRESS PREDICTION (71) Applicant: ARM Limited, Cambridge (GB)

(72) Inventors: Clément Marc Demongeot, Antibes (FR); Louis-Marie Vincent Mouton, Vallauris (FR); Frédéric Claude Marie Piry, Cagnes-sur-Mer (FR); Jocelyn Francois Orion Jaubert, Antibes (FR); Albin Pierick Tonnerre, Sophia Nice (FR)

(73) Assignee: ARM Limited, Cambridge (GB)

( * ) Notice: Subject to any disclaimer, the term of this patent is extended or adjusted under 35 U.S.C. 154(b) by 528 days.

(21) Appl. No.: 13/865,371

(22) Filed: Apr. 18, 2013

(65) Prior Publication Data
US 2014/0317390 A1    Oct. 23, 2014

(51) Int. Cl.
G06F 9/30    (2006.01)
G06F 7/38    (2006.01)
G06F 9/38    (2006.01)

(52) U.S. Cl.
CPC ............ *G06F 9/3844* (2013.01); *G06F 9/3806* (2013.01)

(58) Field of Classification Search
CPC .... G06F 9/3806; G06F 9/3861; G06F 9/3842
See application file for complete search history.

(56) References Cited

U.S. PATENT DOCUMENTS

| 2004/0250054 | A1* | 12/2004 | Stark | G06F 9/3806 712/239 |
| 2006/0036836 | A1* | 2/2006 | Gelman | G06F 9/3844 712/238 |
| 2008/0301420 | A1* | 12/2008 | Inoue | G06F 9/30058 712/240 |
| 2012/0233442 | A1* | 9/2012 | Shah | G06F 9/3806 712/207 |

OTHER PUBLICATIONS

Jourdan, S. et al., "The Effects of Mispredicted-Path Execution on Branch Prediction Structures", IEEE, (1996), pp. 58-67.
Vandierendonck, H. et al., "Speculative Return Address Stack Management Revisited", ACM Transactions on Architecture and Code Optimization, vol. 5, No. 3, Article 15, (Nov. 2008), 20 pages.

* cited by examiner

*Primary Examiner* — Hyun Nam
(74) *Attorney, Agent, or Firm* — Nixon & Vanderhye P.C.

(57) ABSTRACT

A data processing apparatus executes call instructions, and after a sequence of instructions executed in response to a call instruction a return instruction causes the program flow to return to a point in the program sequence associated with that call instruction. The data processing apparatus is configured to speculatively execute instructions in dependence on a predicted outcome of earlier instructions and a return address prediction unit is configured to store return addresses associated with unresolved call instructions. The return address prediction unit comprises: a stack portion onto which return addresses associated with unresolved call instructions are pushed, and from which a return address is popped when a return instruction is speculatively executed; and a buffer portion which stores an entry for each unresolved call instruction executed and for each return instruction which is speculatively executed.

19 Claims, 8 Drawing Sheets

RETURN ADDRESS PREDICTION

BACKGROUND

The present invention relates to a data processing apparatus configured to execute call and return instructions. More particularly, this invention relates to the prediction of return addresses used by the data processing apparatus when speculatively executing instructions.

It is known for a data processing apparatus to be configured to execute call instructions which cause the data processing apparatus to depart from a sequence of program instructions to execute a further sequence of program instructions before returning to the original sequence of program instructions to continue sequential program instruction execution. Indeed, such diversions from the sequential instruction program order may be nested within one another such that whilst executing a sequence of instructions resulting from a first call instruction another call instruction may be encountered leading to execution of a further sequence of instructions, and so on. At the conclusion of any sequence of instructions which have been executed as the result of a call instruction, the end of that sequence is indicated by a return instruction, in response to which the data processing apparatus needs to have reference to a return address which indicates a point in the sequence of program instructions to which it should now be returned (e.g. to the instruction following the call instruction which caused the departure from sequential program instruction execution). In order to manage these return addresses in an efficient manner, in particular when a sequence of nested calls are likely to be encountered, it is known to provide a return stack as a mechanism for storing the required return addresses. This return stack is configured such that when a call instruction is encountered, causing the data processing apparatus to divert from sequential program instruction execution to a further set of instructions, a return address associated with that call instruction (e.g. pointing to the next program instruction following that call instruction) is pushed onto the return stack. Each time a call instruction is encountered, its associated return address is pushed onto the stack. When a return instruction is encountered, a return address is popped off the stack. This enables the return addresses to be easily retrieved in the order required, i.e. in an inverted order with respect to their corresponding call instructions.

It is also known for a data processing apparatus to be configured to speculatively execute data processing instructions. For example, the data processing apparatus may begin executing instructions which are the target of a call instruction, before it is definitively known if that call instruction will be executed. In general, the data processing apparatus can speculatively execute instructions which are the target of any branch instruction (i.e. an instruction which causes a change in program flow) before it is known if that particular branch will be taken or not. The advantages of doing this are well recognised, in that more efficient data processing results, due to not having to wait for resolution of each branch instruction before the instructions which follow it can begin their passage through the pipeline. In the context of speculative instruction execution, a return stack enables the data processing apparatus to predict return addresses for use in that speculative execution and has the advantage that it can efficiently store multiple return addresses, corresponding to a deep history of speculatively executed call instructions. However a return stack also suffers from the disadvantage that when a misprediction occurs the entire return stack of return addresses is generally discarded and a revised return stack must be created with respect to resolved instructions (i.e. those for which speculative execution is known to have been correct). More targeted mechanisms for recovering the return stack in the event of speculation errors have been proposed, but these are generally relatively complex. Also, in a data processing apparatus configured to perform out-of-order instruction execution, complexities arise from handling out-of-order call/return instruction resolution, which in the prior art has required a lot of information to be transferred along the pipeline, making these approaches costly in terms of hardware usage. Some prior art approaches have also lacked accuracy. Two prior art approaches are described in the following documents:

"The effects of mispredicted-path execution on branch prediction structures", Jourdan, S., Hsing, T.-H., Stark, J. and Patt, Y., Proceedings of Parallel Architectures and Compilation Techniques, 1996; and "Speculative return address stack management revisited", Vandierendonck, H. and Seznec, A., ACM Transactions on Architecture and Code Optimization (TACO) November 2008.

It would be desirable to provide an improved technique for storing return addresses for use by a data processing apparatus which is configured to speculatively execute call instructions.

SUMMARY

Viewed from a first aspect, the approach described herein provides a data processing apparatus configured to perform data processing operations in response to an ordered sequence of program instructions, wherein said program instructions comprise call instructions, each said call instruction configured to cause said data processing apparatus to depart from said ordered sequence of program instructions and to execute a further sequence of instructions until a return instruction is encountered and said return instruction configured to cause said data processing apparatus to return to said ordered sequence of program instructions at a return address associated with said call instruction, said data processing apparatus comprising:

an execution unit configured to execute said program instructions, wherein said execution unit is configured to speculatively execute later program instructions in said ordered sequence in dependence on a predicted outcome of earlier program instructions in said ordered sequence; and a return address prediction unit configured to store return addresses associated with unresolved call instructions, and wherein said predicted outcome is dependent on said return addresses, wherein said return address prediction unit comprises:

a stack portion configured to maintain a stack of return addresses associated with said unresolved call instructions, wherein said stack portion is configured to push said return address associated with said call instruction onto said stack when said call instruction is speculatively executed and to pop a stacked return address off said stack for each return instruction which is speculatively executed; and a buffer portion configured to maintain a buffered history of said unresolved call instructions, wherein said buffered history comprises entries for unresolved call instructions and entries for unresolved return instructions.

The present techniques recognise that an improved structure for storing return addresses associated with unresolved call instructions in a return address prediction unit can result by providing a buffer portion which is configured to maintain a buffered history for the unresolved call instructions, where that buffered history has an entry for each call instruction and each return instruction which is speculatively executed. Here, unresolved call instructions are call instructions which have been speculatively executed by said execution unit and for which it is not yet known if the speculative execution was correct, or instructions already sent by the fetch unit to the execution unit which have not yet been executed. An entry for a call instruction can for example comprise a target return address for that call instruction (e.g. the instruction address immediately following the address of the call instruction), whilst an entry for a return instruction may for example merely be a marker indicating the presence of a return instruction. Whatever particular form the entries take, maintaining this detailed history in the return address prediction unit for each call and return instruction which is speculatively executed advantageously enables an improvement in the response to a misprediction, since the mispredicted instruction can be identified in the detailed history and then only entries after the mispredicted instruction need to be removed. However, the present techniques further recognise that maintaining a detailed buffered history for the unresolved call and return instructions has the potential to require a undesirably large amount of storage space. Hence, it is proposed that the return address prediction unit comprises both a buffer portion which maintains a buffered history for unresolved call and return instructions, and stack portion which maintains a stack of return addresses associated with the unresolved call instructions. This enables the advantages of both styles of storage to be gained, namely the recursion depth of the stack portion and the ease of update for the buffer portion. One way of doing this, which takes advantage of the updateability of the buffer portion, is that new call and return instructions which are speculatively executed cause entries in the buffer portion to be made and only once that buffer portion becomes full is space created in the buffer portion by displacing an oldest entry in the buffer portion and if that oldest entry is a return address, transferring it to the stack of return addresses in the stack portion.

There are various ways in which the return address prediction unit could receive information about whether speculative execution of instructions was correct or not, but in one embodiment the data processing apparatus comprises a branch resolution unit configured to maintain a list of unresolved branch instructions, wherein each said unresolved branch instruction is a speculatively executed instruction which can cause a change of program flow for which it is not yet know if the speculative execution was correct, and wherein said branch resolution unit is configured to provide said return address prediction unit with prediction resolution information for each said unresolved branch instruction when said execution unit indicates a correctness of said speculative execution.

In one embodiment, said list of unresolved branch instructions is stored in program sequence order, and wherein said branch resolution unit is configured to store a boundary indication associated with said list, said boundary indication delimiting a first group of unresolved branch instructions, for which corresponding return addresses are currently stacked in said stack portion, from a second group of unresolved branch instructions, for which a corresponding buffered history is currently stored in said buffer portion. It is advantageous for the branch resolution unit to store this boundary indication, because the return address prediction unit is able to make use of different prediction resolution information in dependence on whether a corresponding return address is currently stacked in the stack portion or whether a corresponding buffered history is currently stored in the buffer portion. In particular, in response to a misprediction, whilst for the return stack the usual response is to delete the entire stack of return addresses and to revert to a known state of the data processing apparatus for resolved instructions, the buffered history in the buffer portion enables a more targeted update to be performed with respect to the speculatively executed instructions, in particular only removing entries which correspond to or are younger than the mispredicted instruction.

In a return address prediction unit which only has a stack portion maintaining a stack of return addresses for unresolved call instructions, the limited information available from this stack (i.e. the chronological stack of target return addresses for call instructions) means that the return address prediction unit can only make use of prediction resolution information which comes in program sequence order, i.e. prediction resolution information for a later instruction would not be able to be acted upon until prediction resolution information for an earlier instruction were received. However, according to the present technique, where the return address prediction unit also comprises a buffer portion maintaining a buffered history for unresolved call instructions, the detail of this buffered history enables the return address prediction unit to make use of prediction resolution information unconstrained by the program sequence order of the instructions, since particular call or return instructions can be identified within the buffered history and marked as resolved. This is particularly beneficial in the context of a data processing apparatus which is configured to perform out-of-order instruction execution since correspondingly out-of-order branch resolution can occur and updates can immediately be made in the return address predication unit, rather than having to wait for in-order branch resolution in the branch resolution unit before updates in the return address prediction unit can be made.

In some embodiments, said buffer portion is configured such that a number of entries in said buffered history corresponds to a speculation depth of said execution unit. It is advantageous to size the buffer portion to match the expected speculation depth of the execution unit, i.e. the number of instructions which are expected to be accumulated in a speculative state at any one time, because then size of the buffer portion should be sufficient to allow a buffered history to be maintained for all of these instructions, with the stack portion nevertheless providing a useful further backup, when the speculation depth exceeds this size.

In some embodiments said return address prediction unit is configured, when a next call instruction or a next return instruction is speculatively executed by said execution unit, to determine if a free entry exists in said buffer portion, and when said free entry is determined to exist, to update said free entry corresponding to said next call instruction or said next return instruction respectively. Hence, the return address prediction unit can preferentially store information relating to new speculatively executed instruction in the buffer portion, taking advantage of the improved misprediction response associated therewith.

In some embodiments said return address prediction unit is configured, if it is determined that said free entry does not exist, to flush an oldest entry of said buffered history from said buffer portion to said stack portion and to update a new youngest entry in said buffered history corresponding to said next call instruction or said next return instruction respectively. This enables space to be created in the buffer portion for the next call instruction or next return instruction respectively, and where appropriate to maintain some information, albeit more limited, relating to that oldest entry of the buffered history in the return stack. For example, where that oldest entry of the buffered history is a target return address, this can be pushed onto the return stack. Conversely where that oldest entry of the buffered history is of another kind, it may simply be discarded.

In some embodiments said return address prediction unit is configured to flush an oldest entry of said buffered history from said buffer portion to said stack portion, and to cause said branch resolution unit to adjust said boundary indication to match. This enables the boundary indication in the branch resolution unit to be updated to correspond to the new content of the buffer portion and the stack portion respectively, such that further prediction resolution information provided by the branch resolution unit can be generated accordingly.

In some embodiments said return address prediction unit is configured to set a resolution marker in association with each entry in said buffered history in said buffer portion, wherein said resolution marker is set if speculative execution of a corresponding instruction for that entry has been determined to be correct. This enables the return address prediction unit to update the buffered history in the buffer portion regardless of the order in which resolution relating to speculatively executed instructions is received. This is therefore of particular benefit in the context of a data processing apparatus configured to perform out-of-order instruction execution, in particular where out-of-order branch resolution is expected.

In some embodiments said return address prediction unit is configured, when said speculative execution of said corresponding instruction for that entry has been determined to be correct, and if all older entries in said buffered history have said resolution marker set and if said stack portion is empty, to flush that entry and said older entries from said buffer portion. Whilst the return address prediction unit can be configured to update entries in the buffered history individually, it is advantageous when setting a resolution marker for a given entry in the buffered history to determine if all older entries in the buffered history are also marked as resolved, since when this is the case and when the stack portion is empty, then this part of the buffered history (i.e. this instruction and everything older) is no longer speculative and these entries can be flushed from the buffer portion.

In some embodiments, said return address prediction unit is configured to store a pairing marker in association with each return instruction entry in said buffer portion, said pairing marker indicative of a relative position in said buffer history of a call instruction entry corresponding to said return instruction entry. This enables the corresponding call instruction entry for a given return instruction entry to be found, which in particular enables the required target return address to be found when a return instruction is executed, since the target return address is typically stored in association with the call instruction entry, whilst the return instruction entry itself is typically merely a marker to indicate the presence of a return instruction.

The pairing marker could take a number of different forms, but in one embodiment said pairing marker is a counter, said counter indicative of a number of intervening call instruction entries between said return instruction entry and said call instruction entry. Accordingly, this provides a simple and efficient mechanism for identifying the relevant call instruction entry, by simply proceeding through the entries of the buffered history counting call instructions and skipping the number indicated by the counter.

In some embodiments said return address prediction unit is configured, if speculative execution of an instruction corresponding to a selected entry of said buffered history is determined to be incorrect, to clear said selected entry and all younger entries from said buffered history.

In some embodiments said return address prediction unit further comprises an architectural return stack portion, said architectural return stack portion configured to maintain an architectural stack of return addresses for resolved call instructions. An architectural return stack may be maintained for resolved call instructions to provide a reference for the return address prediction unit with respect to instructions that are known to have been correctly executed, i.e. this set of information is architecturally correct. There are various ways in which the return address prediction unit can make use of this information.

In one embodiment said return address prediction unit is configured, if said prediction resolution information indicates that speculative execution of said call instruction having said return address in said stack was correct, to update said architectural return stack portion by pushing said return address onto said architectural stack.

In one embodiment, wherein said return address prediction unit further comprises an architectural return stack portion, said architectural return stack portion is configured to maintain an architectural stack of return addresses for resolved call instructions, wherein said return address prediction unit is configured, if said prediction resolution information indicates that speculative execution of an instruction in said first group was incorrect, to copy content of said architectural return stack portion to said stack portion.

In one embodiment said return address prediction unit is further configured, if said prediction resolution information indicates that speculative execution of an instruction in said first group was incorrect, to clear said buffered history.

Viewed from a second aspect, the approach described herein provides a data processing apparatus configured to perform data processing operations in response to an ordered sequence of program instructions, wherein said program instructions comprise call instructions, each said call instruction configured to cause said data processing apparatus to depart from said ordered sequence of program instructions and to execute a further sequence of instructions until a return instruction is encountered and said return instruction configured to cause said data processing apparatus to return to said ordered sequence of program instructions at a return address associated with said call instruction, said data processing apparatus comprising:

means for executing said program instructions, wherein said means for executing is configured to speculatively execute later program instructions in said ordered sequence in dependence on a predicted outcome of earlier program instructions in said ordered sequence; and means for storing return addresses associated with unresolved call instructions, and wherein said predicted outcome is dependent on said return addresses, wherein said means for storing return addresses comprises:

means for maintaining a stack of return addresses associated with said unresolved call instructions, wherein said means for maintaining a stack of return addresses is configured to push said return address associated with said call instruction onto said stack when said call instruction is speculatively executed and to pop a stacked return address off said stack when said return instruction is speculatively executed; and means for maintaining a buffered history for said unresolved call instructions, wherein said buffered history comprises entries for unresolved call instructions and entries for unresolved return instructions.

Viewed from a third aspect, the approach described herein provides a method of data processing in a data processing apparatus, the method comprising the steps of:

performing data processing operations in response to an ordered sequence of program instructions, wherein said program instructions comprise call instructions;

in response to each said call instruction, departing from said ordered sequence of program instructions and executing a further sequence of instructions until a return instruction is encountered;

in response to said return instruction, returning to said ordered sequence of program instructions at a return address associated with said call instruction;

speculatively executing later program instructions in said ordered sequence in dependence on a predicted outcome of earlier program instructions in said ordered sequence; and storing return addresses associated with unresolved call instructions, and wherein said predicted outcome is dependent on said return addresses, wherein said storing comprises:

maintaining a stack of return addresses for said unresolved call instructions, wherein said stack is maintained by pushing said return address associated with said call instruction onto said stack when said call instruction is speculatively executed and popping a stacked return address off said stack when said return instruction is speculatively executed; and maintaining a buffered history for said unresolved call instructions, wherein said buffered history comprises entries for unresolved call instructions and entries for unresolved return instructions.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1A:
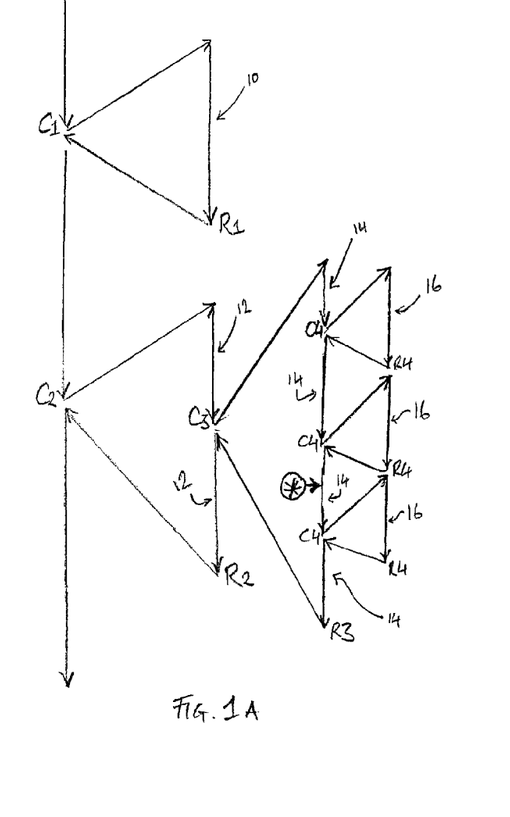
FIG. 1A schematically illustrates changes in sequential program instruction execution when call instructions are encountered.

FIG. 1A schematically illustrates diversions from sequential program instruction execution which are caused when call instructions are encountered. The vertical, downward pointing arrows represent execution of a sequence of program instructions, whilst the diagonal arrows represent diversions in response to call or return instructions. In the first example, the consequence of call instruction C1 is relatively simple in that it causes a sequence of instructions 10 to be executed until a return instruction R1 is encountered which causes the program flow to return to the original sequence of program instructions at an instruction immediately following instruction C1. The diversion caused by the next call instruction encountered, C2 is more complex. C2 also causes a further sequence of program instructions 12 to be executed, but part way through this sequence a further call instruction C3 is encountered which causes a further sequence of program instructions 14 to be executed. Within this further sequence of program instructions 14, a yet further call instruction C4 is encountered which causes the further sequence of program instructions 16 to be executed. Furthermore, during the sequence of program instructions 14 executed as a result of the diversion caused by the call instruction C3, this call instruction C4 is encountered three times. Also shown by the asterisk in FIG. 1A is a point in the sequence of program instructions 14 between the second and third instances of the call instruction C4, which will be discussed with reference to FIG. 1B.

Figure 1B:
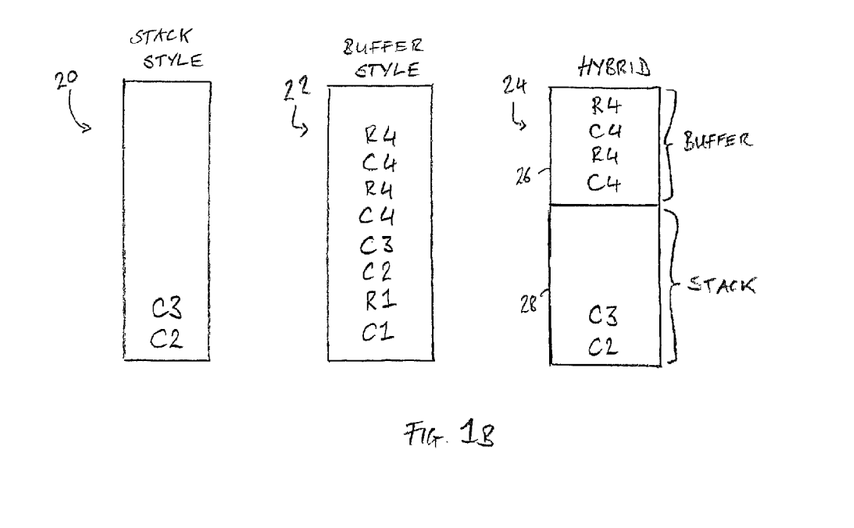
FIG. 1B schematically illustrates the content of three different styles of return address storage structure at a selected point in the execution illustrated in FIG. 1A.

FIG. 1B schematically illustrates three different styles of return address storage. The stack style 20 implements a conventional return address stack in which a return address corresponding to a call instruction is pushed onto the stack when the call instruction is encountered and a return address is popped off the stack when a return instruction is encountered. The buffer style 22 maintains a detailed history of call and return instructions encountered, having an entry for each call instruction and for each return instruction encountered. The hybrid return address structure 24 is in accordance with one embodiment of the present invention and comprises a buffer portion 26 and a stack portion 28. In a similar manner to structure 22, the buffer portion 26 maintains a detailed history of call and return instructions, whilst the stack portion 28, similarly to structure 20, maintains a simple stack of return addresses corresponding to the call instructions encountered. The content of the return address structures shown in FIG. 1B corresponds to the point illustrated with the asterisk in FIG. 1A, namely prior to the third instance of the call instruction C4 being encountered. At this point the stack style return address structure 20 contains return addresses for call instructions C2 and C3, whilst the buffer style return address structure 22 contains entries corresponding to each call and return instruction encountered up to this point.

In the hybrid return address structure 24, the buffer portion 26 has four entries in which the detailed history of call and return instruction execution can be stored. When the history exceeds this number of entries, an oldest entry in the buffer portion is flushed to the stack portion 28. The stack portion of course only stores return addresses corresponding to call instructions, and accordingly, if the instruction flushed from the buffer portion 26 is a return instruction, it is simply discarded, whereas if the instruction flushed from the buffer portion 26 is a call instruction (i.e. a target return address corresponding to a call instruction) then it is transferred to the stack portion 28. Hence, in the example shown in FIG. 1B, illustrating the content at the point illustrated by the asterisk in FIG. 1A, the stack portion 28 contains two target return addresses corresponding to call instructions C2 and C3, whilst the buffer portion 26 contains four entries corresponding to the four most recently encountered call and return instructions namely C4, R4, C4 and R4.

The hybrid stack-buffer return address structure 24 shown in FIG. 1B is of particular benefit in the context of a return address prediction unit in a data processing apparatus which is configured to perform speculative instruction execution. A return address storage structure enables the return address prediction unit to provide predictions of the target return addresses for call instructions which are speculatively executed, but it is also necessary for mechanisms to be provided to cope with the situation when mispredictions in the speculative execution occur. For example, in the context of the situation illustrated in FIG. 1A, consider the situation that the illustrated instruction execution is speculative, and at the point illustrated with the asterisk it is determined that the speculative execution of the second instance of the call instruction C4 was incorrect. In this situation, the limited information stored in a stack style return address structure 20 does not allow any corresponding updates to be made and generally the approach taken when this style of return address structure is provided is to simply flush the entire content of the stack and the speculative instruction execution must also be correspondingly rewound. However, when a buffer style return address structure 22 is provided, the more detailed history held in this structure enables a more targeted update to be performed, namely one in which the two most recent entries, R4 and C4, corresponding to the mispredicted call instruction C4 (and consequently R4) can simply be deleted from the buffer history. Whilst this is advantageous in terms of the improved update that is possible, as mentioned the buffer style return address structure 22 suffers from the disadvantage it may require a very large amount of storage space to maintain the detailed history. For example, whilst the example shown in FIG. 1A is relatively simple (for clarity of illustration purposes) it can readily be seen that if the call instruction C4 was called many times during the sequence of instructions 14 which result from the diversion caused by call instruction C3, the corresponding C4 and R4 entries in the buffered history could require a great deal of storage space. By contrast, a stack style return address structure 20 does not suffer from these problems since each iteration of a call instruction C4 and return instruction R4 pair pushes a target return address onto the stack and then pops it off again, thus not causing any growth in the amount of storage required. The hybrid stack-buffer return address structure 24 gains advantages from both styles of return address storage. It should be noted that the hybrid stack-buffer return address structure 24 schematically illustrated in FIG. 1B is shown with only four entries possible in the buffer portion 26. This is for simplicity of illustration only to illustrate the principle of operation with regard to the example of FIG. 1A and indeed typically the number of entries in the buffer portion 26 may well be more than this. In fact, the number of entries in the buffer portion 26 is advantageously sized to correspond to the expected speculation depth of the execution unit, such that the buffer portion 26 should generally be able to accommodate a full history of all unresolved instructions.

Figure 2:
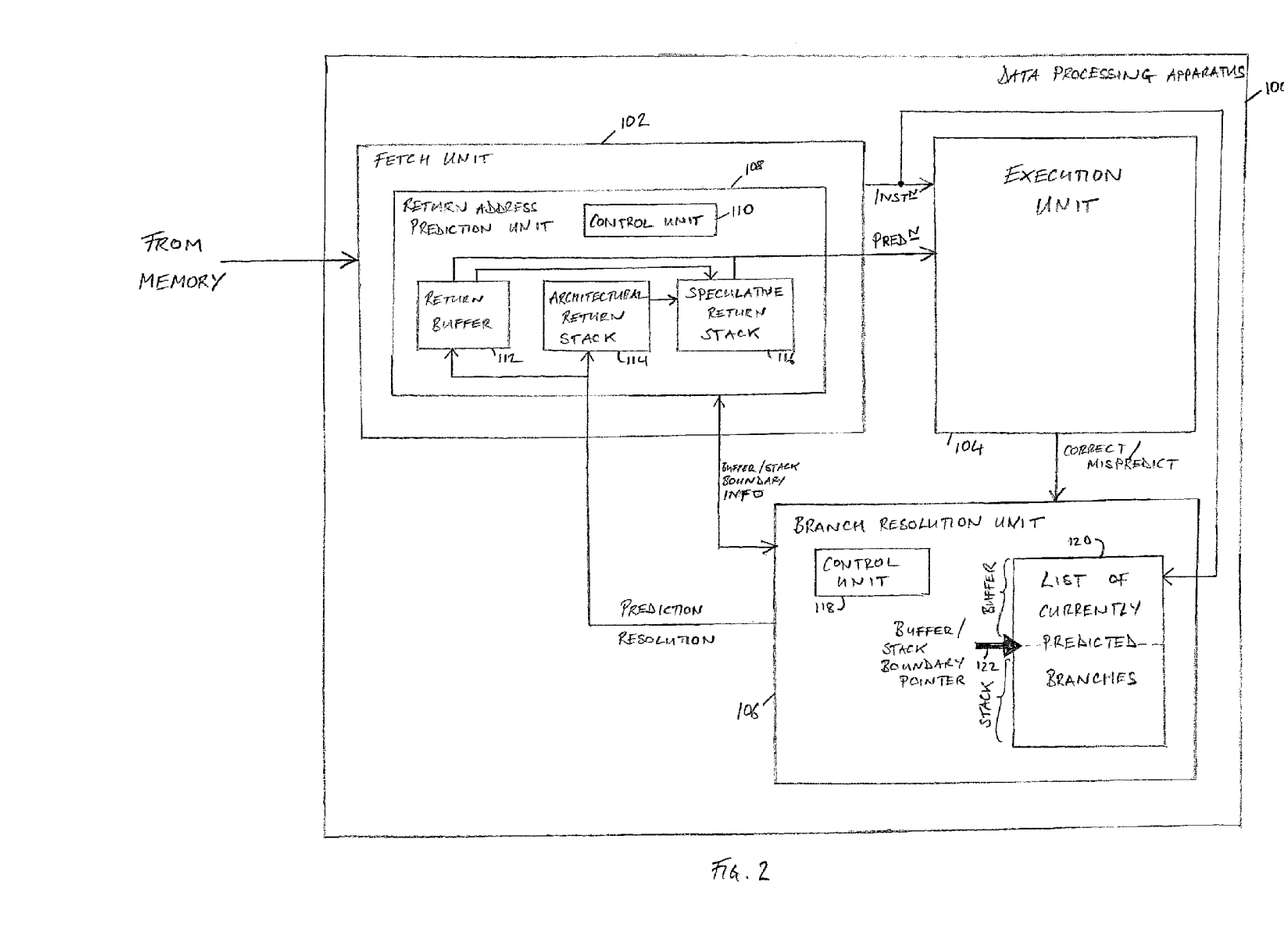
FIG. 2 schematically illustrate a data processing apparatus comprising a return address prediction unit in one embodiment.

FIG. 2 schematically illustrates a data processing apparatus 100 in one embodiment. It will of course be recognised that, even as illustrated schematically, the data processing apparatus 100 will comprise many more components than those shown in FIG. 2, but for clarity of illustration only the components of relevance to the techniques discussed herein are shown. The three main components of the data processing apparatus 100 are the fetch unit 102, the execution unit 104 and the branch resolution unit 104 and the branch resolution unit 106. Program instructions to be executed by the execution 104 are retrieved from external memory (not shown) and received by the fetch unit 102 which passes these on to the execution unit 104. The data processing apparatus 100 is configured to perform speculative program instruction execution, wherein the execution unit 104 begins execution of program instructions before it is definitively confirmed that those instructions should be executed. As part of this speculative execution, the data processing apparatus makes predictions for branches in the sequence of program instructions (i.e. instructions which can cause a change in sequential program instruction execution), further speculative execution of instructions then being carried out on the basis of the expected outcome of each branch. One aspect of the predictions that must be made comes in the context of call instructions and their associated target return addresses. In order to provide predictions of return addresses to the execution unit 104, the fetch unit 102 comprises a return address prediction unit 108.

The return address prediction unit 108 operates generally under control of control unit 110, and comprises a return buffer 112, an architectural return stack 114 and a speculative return stack 116. Together the return buffer 112 and the speculative return stack 116 form a hybrid stack-buffer such as that discussed with reference to FIG. 1B. When return instructions are identified in the instructions retrieved from memory by the fetch unit, the return address prediction unit makes predictions for the corresponding target return addresses on the basis of the content of return buffer 112 and the speculative return stack 116, and the corresponding instructions at those target addresses are passed to the execution unit 104 as a prediction by the fetch unit 102.

Whilst the contents of the return buffer 112 and speculative return stack 116 correspond to speculatively executed instructions which are as yet unresolved (i.e. it is not yet known whether speculative execution of the corresponding instructions were correct or not), the architectural return stack 114 is maintained by the return address prediction unit 108 to correspond to resolved call instructions (i.e. only those for which it is known that speculative execution was correct). Information relating to whether a speculatively executed instruction was correct or not, i.e. whether that speculative execution was correct or a misprediction, is generated by the execution unit 104 by comparison of "predicted state" resulting from speculative execution and "actual state" resulting from resolved instruction execution. These signals are passed from the execution unit 104 to the branch resolution unit 106.

Branch resolution unit 106 operates under the overall control of control unit 118 and comprises a list of currently predicted branches 120. Branch resolution unit 106 maintains in the list of currently predicted branches 120 an indication of each branch instruction which has been speculatively executed. Hence, as instructions are passed from the fetch unit 102 to the execution unit 104 for execution, entries are also made as appropriate in the list of currently predicted branches 120. The list of currently predicted branches 120 is maintained in program sequence order, with new instructions being added at a younger end of the list and oldest instructions in the list being retired from the list once they are resolved. The list of currently predicted branches 120 contains entries corresponding to any instructions which can cause a change in sequential program instruction execution which have been speculatively executed, i.e. not only call and return instructions. Nevertheless call and return instructions do populate this list and accordingly part of the list corresponds to the content of the return buffer 112 and (when the speculative return stack 116 is used) part of it corresponds to the content of the speculative return stack 116. The branch resolution unit 106 maintains a buffer/stack boundary pointer 122 to indicate where the list divides between content that corresponds to the buffer 112 and the stack 116. In order to keep this pointer up-to-date the branch resolution unit 106 receives information from the return address prediction unit 108 about the current distribution between the buffer 112 and the stack 116.

For example if an entry in the buffer 112 is flushed to the stack 116, the return address prediction unit 108 signals this fact to the branch resolution unit 106 so that it can update the boundary pointer 122 accordingly. Maintenance of this pointer 122 is significant, because a return stack can only make use of prediction resolution information in sequential program instruction, whilst the return buffer 112 is able to make use of prediction resolution in any order. The execution unit 104 is configured to perform out-of-order instruction execution and accordingly the "correct/mispredict" resolution information generated by the execution unit 104 can be generated in any order. Conversely, the branch resolution unit 106 is also configured to provide the return address prediction unit 108 with information relating to the current position of the pointer 122, for example to be used by the return address prediction unit 108 when the branch resolution unit sends prediction resolution information indicating a correctly predicted call or return instruction.

Hence, the branch resolution unit 106 is configured, when this resolution information is received from the execution unit 104 to determine whether the corresponding instruction in the list of currently predicted branches 120 forms part of the instructions for which a buffered history is currently stored in return buffer 112 or whether it falls within the part of list 120 for which target return addresses are stored in the speculative return stack 116. Where the instruction corresponds to a target return address stored in speculative return stack 116, the prediction resolution information can only be provided in program sequence order and accordingly if older unresolved instructions exist in the list 120 then the list is updated but no prediction resolution is yet passed on to the return address prediction unit 108. However, when the instruction in the list 120 lies within the buffer portion, the prediction resolution information can be passed on to the return address prediction unit 108 straight away. The prediction resolution information is used to update the content of the return buffer 112 and the architectural return stack 114, as will be discussed in more detail below. When mispredictions occur, the content of the architectural return stack 114 can be used to update (replace) the content of the speculative return stack 116, as will also be described in more detail below.

Figure 3:
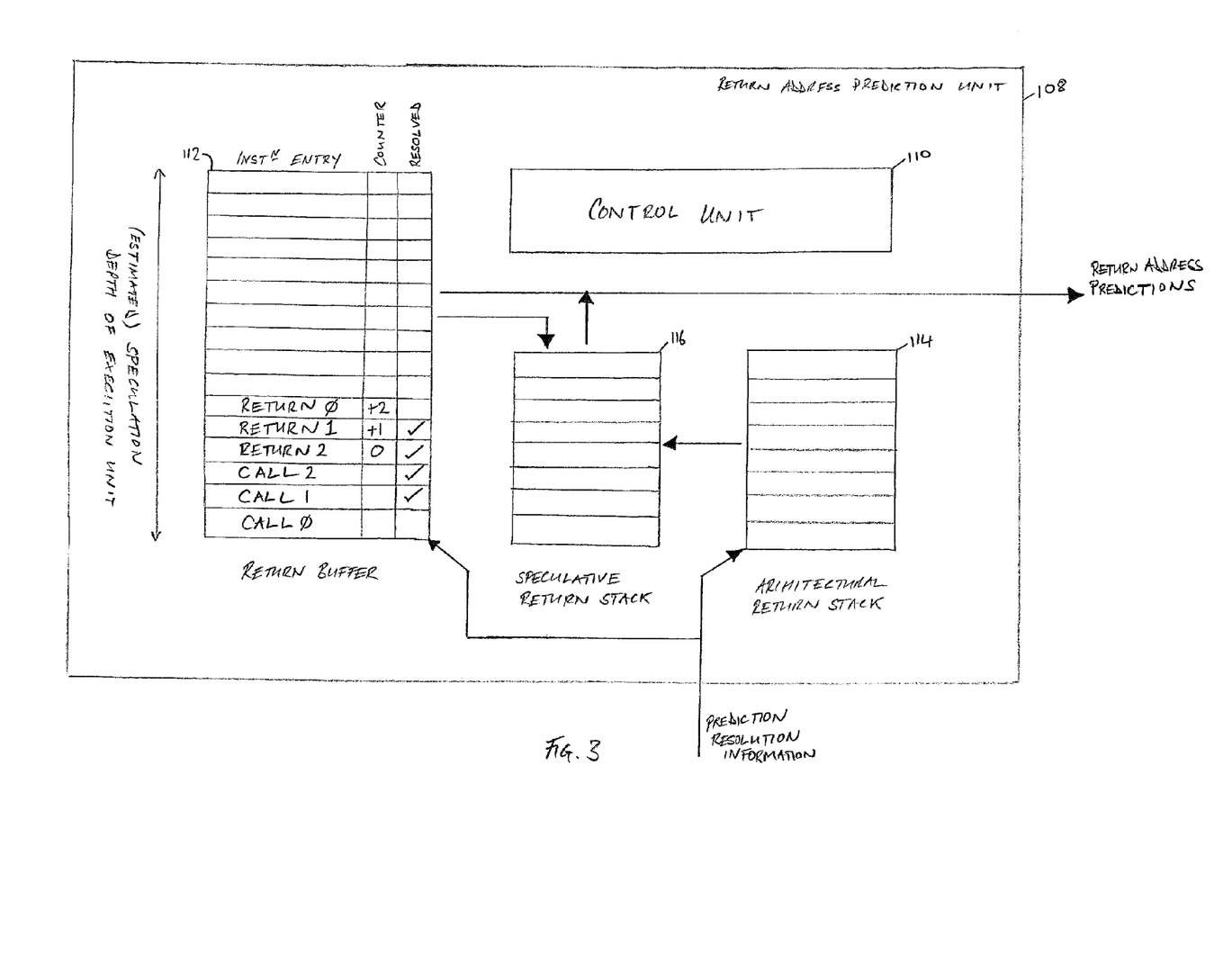
FIG. 3 schematically illustrates a return address prediction unit in one embodiment.

FIG. 3 schematically illustrates in more detail the return address prediction unit 108 shown in FIG. 2. As shown in FIG. 2, the components of this unit discussed here are the control unit 110, the return buffer 112, the architectural return stack 114, and the speculative return stack 116. FIG. 3 schematically illustrates more detail of the return buffer 112. As previously mentioned, this return buffer maintains a detailed history of the speculatively executed call and return instructions. In the example illustrated in the Figure, the data processing apparatus has speculatively executed a sequence of three call instructions (call 0, call 1 and call 2) and their associated return instructions (return 2, return 1 and return 0). The return buffer 112 has an entry for each of these instructions. Whilst for clarity of understanding in the figure each entry is labelled as "call 0", "return 2" and so on, note that the entries for call instructions in fact store a 32-bit target address whilst the entries for return instructions are simply a marker indicating the presence of a return instruction. In addition to the marker for each return instruction the return buffer is configured to store a counter value is association with each return instruction entry which indicates its associated call instruction. In this embodiment, the counter is configured to indicate the number of call instructions which must be skipped when proceeding in reverse chronological order through the entries in the buffer to reach the corresponding call instruction. Hence, for example, a value of +1 is stored in association with return 1, indicating that call 2 should be skipped and that call 1 is the associated call instruction.

The return buffer 112 is further configured to store resolution information in association with each entry in the buffer, indicating whether the corresponding instruction has been indicated by the branch resolution unit to have been resolved. In the example situation illustrated in the figure, call 1, call 2, return 2 and return 1 are marked as resolved, whilst call 0 and return 0 are still unresolved. Since call 0 precedes the other calls in sequential program execution order, these entries remain in the buffer until call 0 is itself resolved, as will be discussed in more detail below. The number of entries in the return buffer 112 is configured to correspond to the estimated speculation depth of the execution unit 104, such that in a situation such as that illustrated in the figure where call 0 remains unresolved, further entries in the return buffer 112 can be made to accommodate a number of further instructions executed subsequent to call 0 (and therefore also speculative whilst the status of call 0 remains unresolved). By providing this size of return buffer 112, in most circumstances it can be expected that the return buffer should be able to accommodate all call and return instructions which are currently in an unresolved state in the data processing apparatus. Nevertheless, the speculative return stack 116 allows for the possibility that this estimated speculation depth of the execution unit is exceeded and if further entries to the return buffer 116 are attempted before a free entry is available then the oldest entry in the return buffer 116 is flushed to the speculative return stack 116, with target return addresses for call instructions being pushed onto the stack and return markers being discarded.

Figure 4:
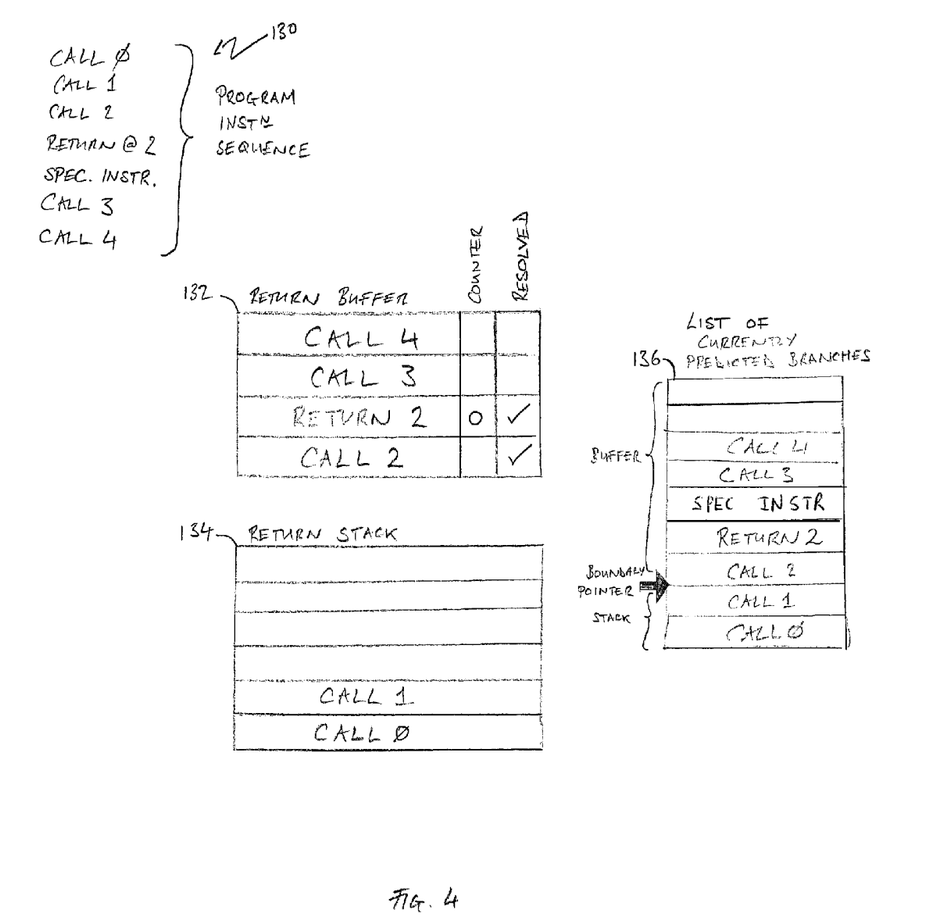
FIG. 4 schematically illustrates the content of a return buffer and return stack and a list of currently predicted branches resulting from speculative execution of an example program instruction sequence.

To illustrate the use of both the return buffer and the return stack, FIG. 4 schematically illustrates a simple example of a sequence of program instructions 130 which have been speculatively executed, their corresponding entries in the list of currently predicted branches 136, the contents of a limited size return buffer 132 and the content of a return stack 134. Note that the program instruction sequence 130 contains both call and return instructions as well as a further "speculative instruction", which is another instruction which can cause a change in sequential program order instruction execution. Each of these instructions therefore has a corresponding entry in the list of currently predicted branches 136. However, only the call and return instructions result in entries in the return buffer 132, and indeed only the "overflow" target return addresses corresponding to call 0 and call 1 have been pushed onto the return stack 134. Note that return buffer 132 has been illustrated with only four entries for simplicity of illustration and to illustrate the overflow into return stack 134. As mentioned before, in order to accommodate the speculation depth of the execution unit, the number of entries in the return buffer 132 which typically be greater. The boundary pointer stored in association with the list of currently predicted branches 136 indicates which instructions have corresponding entries in return stack 134 and in the return buffer 132, and accordingly the branch resolution unit has been able to already pass on resolution information relating to the instructions call 2 and return 2 which are correspondingly marked as resolved in return buffer 132.

Figure 5:
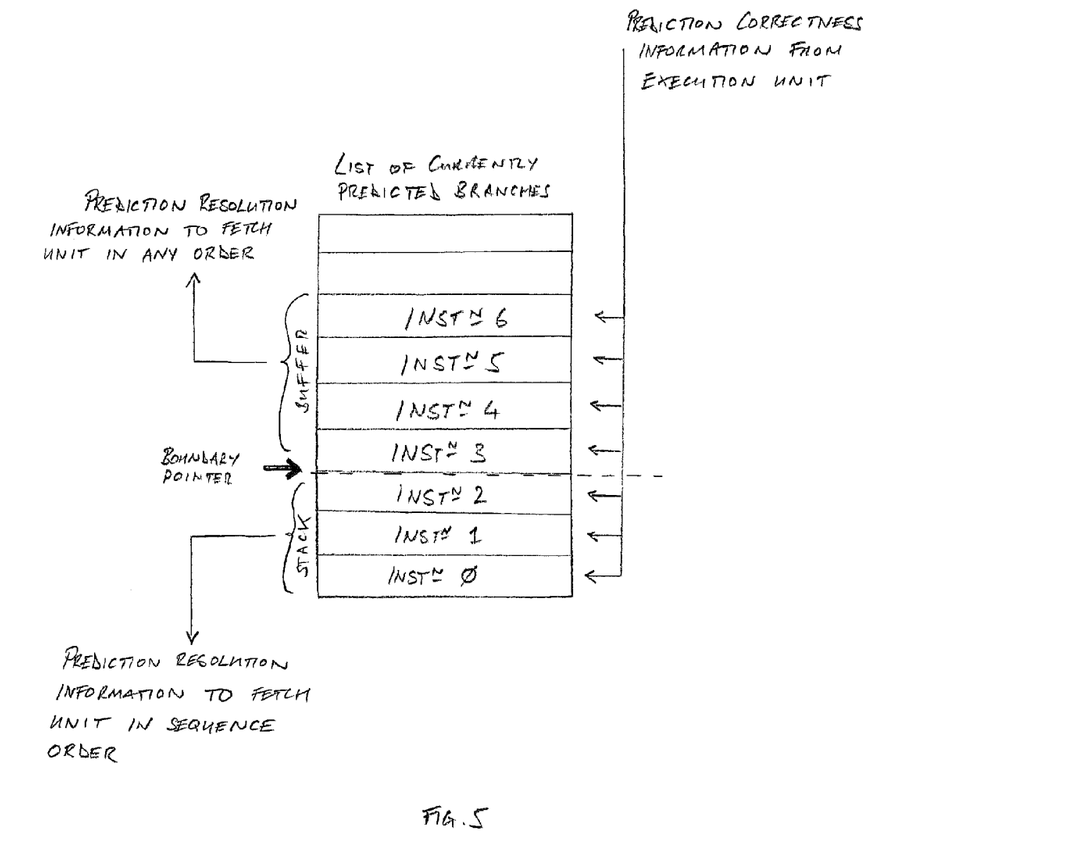
FIG. 5 schematically illustrates a list of currently predicted branches.

FIG. 5 schematically illustrates the distinction between instructions above the boundary pointer and below the boundary in pointer in the list of currently predicted branches. The prediction correctness information (i.e. correct/misprediction) from the execution unit can be received in any order because the execution unit is configured to perform out-of-order instruction execution. As mentioned above, prediction resolution information generated by the branch resolution unit can only passed to the return address prediction unit in program sequence order for instructions corresponding to entries in the return stack, whilst prediction resolution information for instructions for which entries are made in the return buffer can be passed in any order.

Figure 6:
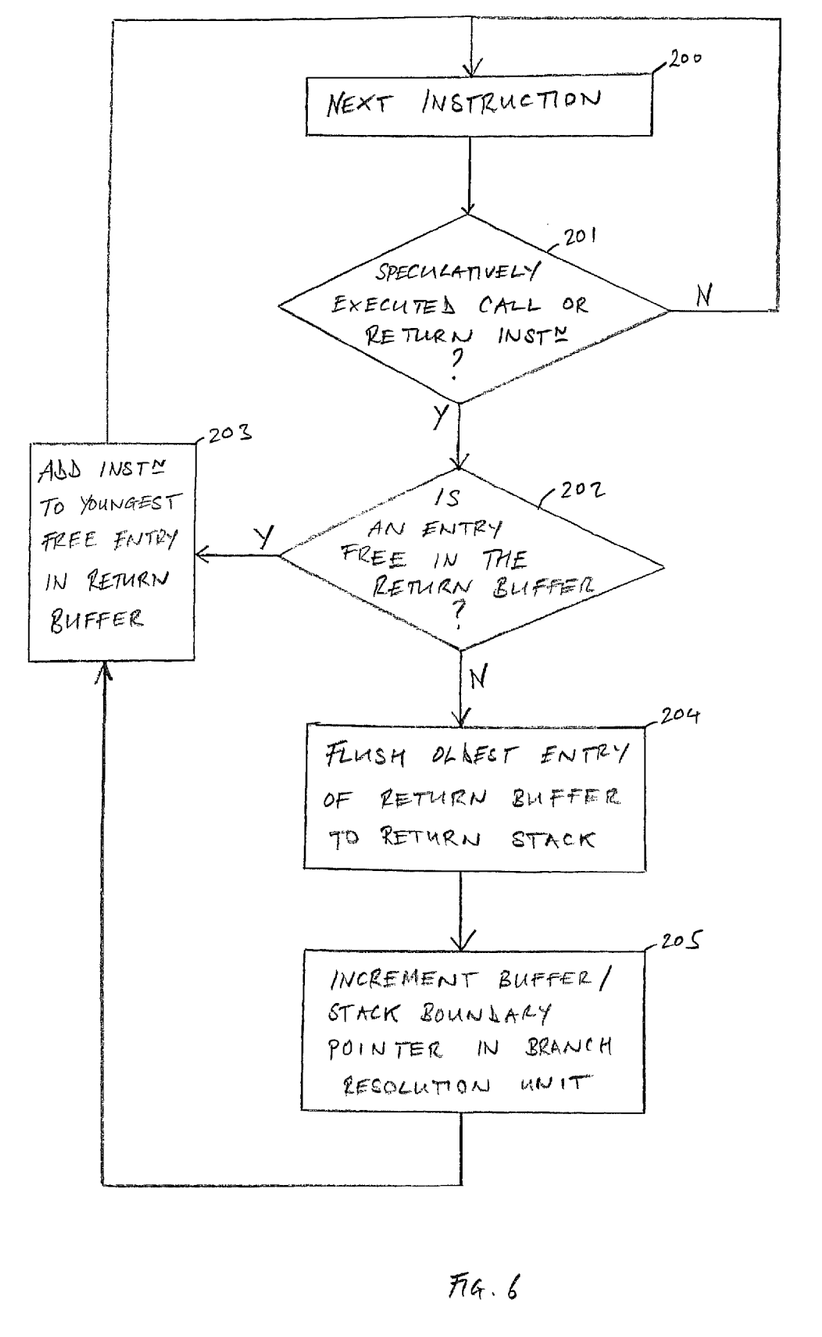
FIG. 6 schematically illustrates a sequence of steps taken when a call or return instruction is speculatively executed in one embodiment.

FIG. 6 schematically illustrates a sequence of steps which are taken in the return address prediction unit 108 illustrated in FIG. 2. When a new instruction in the sequence of instructions retrieved from memory is received (step 200) it is determined at step 201 if this instruction will be speculatively executed and if it is a call or a return instruction. If it is not then the flow simply returns to step 200. If it is however, then the flow proceeds to step 202 where it is determined if there is currently an entry free in the return buffer 112. If there is then the flow proceeds to step 203 where this latest instruction is added to the youngest free entry in the return buffer and the flow returns to step 200. If however there are no free entries in the return buffer 112, then the flow proceeds to step 204, where the oldest entry in the return buffer is flushed to the speculative return stack 116. As described above, what this means is that for a call instruction the stored target return address is pushed onto the speculative return stack 116, whilst a marker indicating a return instruction is simply discarded. Then at step 205, the return address prediction unit 108 signals to the branch resolution 106 that the buffer/stack boundary pointer 122 should be incremented in association with the list of currently predicted branches 120, to indicate the redistribution of instructions between the return buffer 112 and the speculative return stack 116. The flow then returns to step 203 where the new instruction can be added to the youngest (just created) free entry in the return buffer 112. The flow then returns to step 200.

Figure 7:
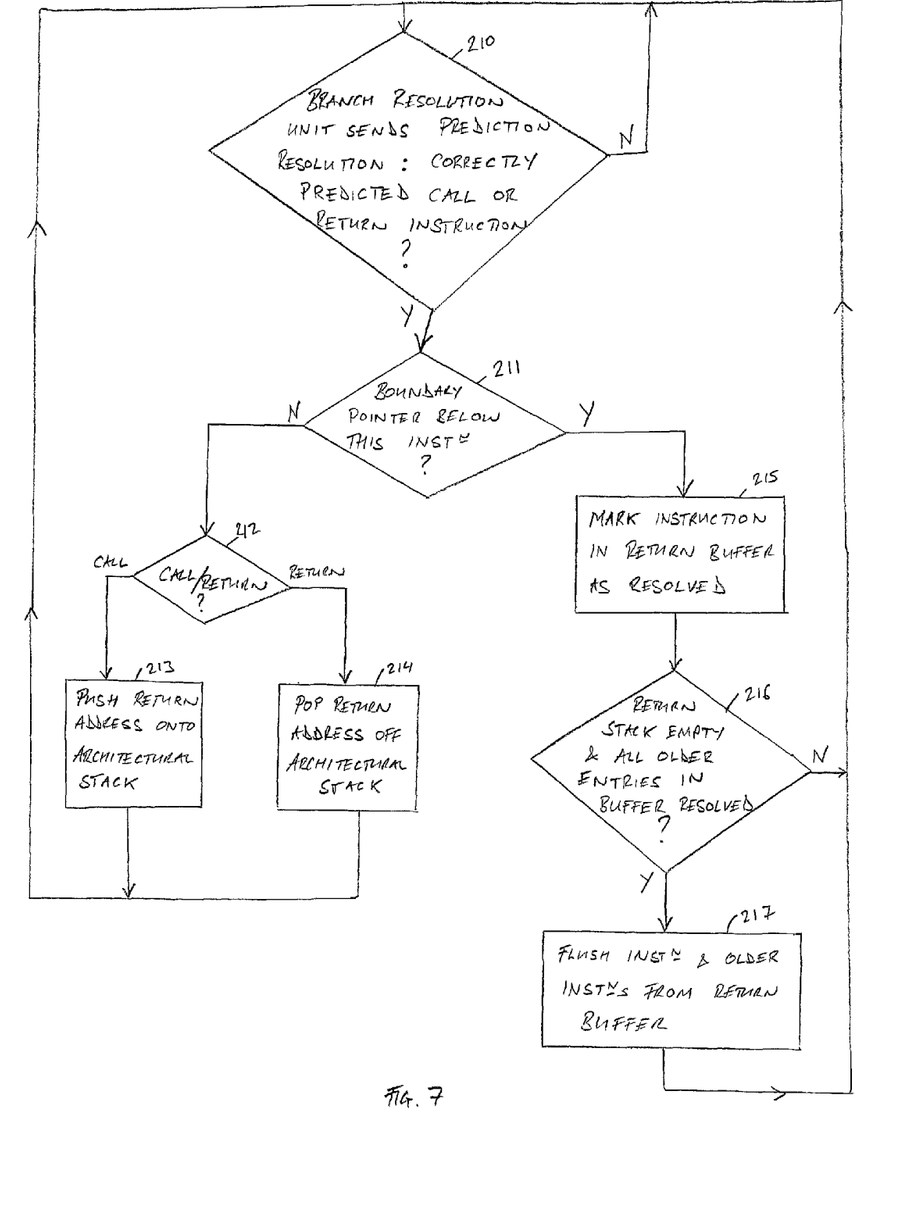
FIG. 7 schematically illustrates a sequence of steps which are taken when a branch resolution unit indicates that a call or return instruction has been correctly predicted in one embodiment.

FIG. 7 schematically illustrates a series of steps which are taken in the return address prediction unit 108 schematically illustrated in FIG. 2, in particular when prediction resolution information is received from the branch resolution unit 106 indicating that a call or return instruction has been correctly predicted. The flow begins at step 200 where the flow loops upon itself until such information is received from the branch resolution unit 106. When it is the flow proceeds to step 211, where it is determined if the boundary pointer is currently below this instruction in the list of currently predicted branches 120. In other words, the branch resolution unit 106 is configured to pass information relating to the current position of the buffer/stack boundary pointer to the return address prediction unit 108. If this information indicates that the boundary pointer is not below this instruction, i.e. this instruction is within the stack portion, then the flow proceeds to step 212, where it is determined if this a call or a return instruction. For a call instruction, the flow proceeds to step 213, where the corresponding target return address is pushed onto the architectural return stack 114. For a return instruction the flow proceeds to step 214 where a return address is popped off the architectural return stack 114. In this manner the architectural return stack 114 is maintained with respect to resolved instructions.

Alternatively at step 211, if the buffer/stack boundary pointer information indicates that the boundary pointer is below this instruction, i.e. that this instruction is within the buffer portion, then the flow proceeds to step 215, where the corresponding entry in the return buffer 112 is marked to indicate that this instruction is resolved. The flow continues to step 216 where it is determined if the speculative return stack 116 is currently empty and if all older entries in the return buffer 116 are also marked as resolved. If this condition is not true then the flow returns directly to step 210. When it is true however, the flow proceeds to step 217 where this instruction and all older instructions are flushed from the return buffer 112, and then the flow returns to step 210.

Figure 8:
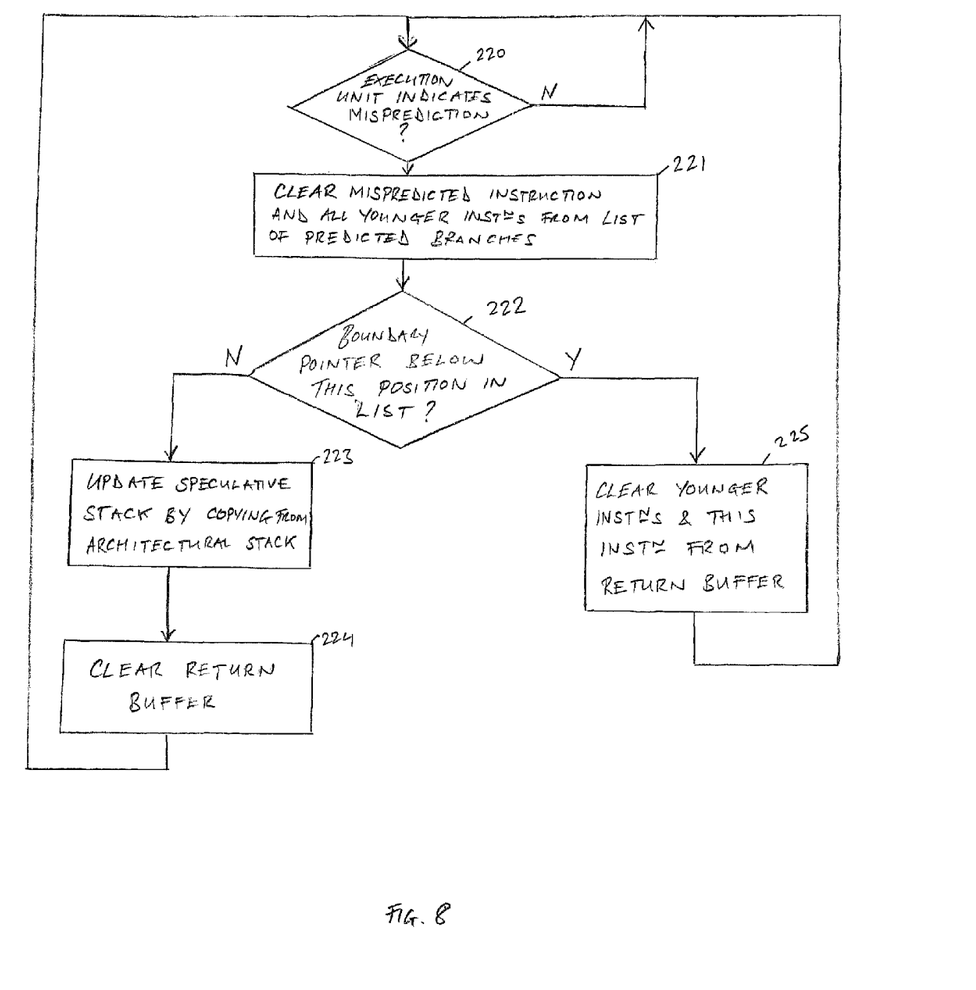
FIG. 8 schematically illustrates a sequence of steps which are taken when an execution unit indicates that a misprediction has occurred.

FIG. 8 schematically illustrates a sequence of steps which are taken in the data processing apparatus when the execution unit 104 indicates that a misprediction has occurred. The flow loops upon itself at step 220 until this is the case. Then at step 221, the branch resolution unit 106 clears the mispredicted instruction and all younger instructions from the list of currently predicted branches 120. Then, at step 222 (although it should be noted that there is no need for steps 221 and 222 to be in the illustrated order) it is determined if the buffer/stack boundary pointer (prior to clearing the instructions from the list) indicates that the mispredicted instruction was in the stack or the buffer portion. If the boundary pointer was above the position of this mispredicted instruction in the list (i.e. it was in the stack portion) then the flow proceeds to step 223 where, in the return address prediction unit, the speculative return stack 116 is updated by copying the content of the architectural return stack 114 to replace the content of the speculative return stack 116. Then at step 224 the content of the return buffer 112 is cleared, and the flow returns to step 220. Alternatively at step 222 if it is determined that this mispredicted instruction was in the buffer portion, i.e. the boundary pointer was below the position of this mispredicted instruction in the list, then the flow proceeds to step 225, where entries corresponding to this instruction and all younger instructions are cleared from the return buffer 112 and the flow returns to step 220. In other words, when the mispredicted instruction has a corresponding entry in the return buffer 112, a considerably less disruptive update procedure can be carried out, benefitting from the buffered history stored in the return buffer 112.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus configured to perform data processing operations in response to an ordered sequence of program instructions, wherein said program instructions comprise call instructions, each said call instruction configured to cause said data processing apparatus to depart from said ordered sequence of program instructions and to execute a further sequence of instructions until a return instruction is encountered and said return instruction configured to cause said data processing apparatus to return to said ordered sequence of program instructions at a return address for said call instruction, said data processing apparatus comprising:

an execution unit configured to execute said program instructions, wherein said execution unit is configured to speculatively execute later program instructions in said ordered sequence in dependence on a predicted outcome of earlier program instructions in said ordered sequence; and a return address prediction unit configured to store return addresses for unresolved call instructions, and wherein said predicted outcome is dependent on said return addresses, wherein said return address prediction unit comprises:

a stack portion configured to maintain a stack of return addresses for said unresolved call instructions, wherein said stack portion is configured to push said return address onto said stack when said call instruction is speculatively executed and to pop a stacked return address off said stack when said return instruction is speculatively executed; and a buffer portion configured to maintain a buffered history for said unresolved call instructions, wherein said buffered history comprises entries for unresolved call instructions and entries for unresolved return instructions.

2. The data processing apparatus as claimed in claim 1, comprising a branch resolution unit configured to maintain a list of unresolved branch instructions, wherein each said unresolved branch instruction is a speculatively executed instruction which can cause a change of program flow for which it is not yet known if the speculative execution was correct, and wherein said branch resolution unit is configured to provide said return address prediction unit with prediction resolution information for each said unresolved branch instruction when said execution unit indicates a correctness of said speculative execution.

3. The data processing apparatus as claimed in claim 2, wherein said list of unresolved branch instructions is stored in program sequence order, and wherein said branch resolution unit is configured to store a boundary indication for said list, said boundary indication delimiting a first group of unresolved branch instructions, for which corresponding return addresses are currently stacked in said stack portion, from a second group of unresolved branch instructions, for which a corresponding buffered history is currently stored in said buffer portion.

4. The data processing apparatus as claimed in claim 3, wherein said branch resolution unit is configured to be able to deviate from said program sequence order when providing said prediction resolution information for said second group of unresolved branch instructions.

5. The data processing apparatus as claimed in claim 1, wherein said buffer portion is configured such that a number of entries in said buffered history corresponds to a speculation depth of said execution unit.

6. The data processing apparatus as claimed in claim 1, wherein said return address prediction unit is configured, when a next call instruction or a next return instruction is speculatively executed by said execution unit, to determine if a free entry exists in said buffer portion, and when said free entry is determined to exist, to update said free entry corresponding to said next call instruction or said next return instruction respectively.

7. The data processing apparatus as claimed in claim 6, wherein said return address prediction unit is configured, if it is determined that said free entry does not exist, to flush an oldest entry of said buffered history from said buffer portion to said stack portion and to update a new youngest entry in said buffered history corresponding to said next call instruction or said next return instruction respectively.

8. The data processing apparatus as claimed in claim 3, wherein said return address prediction unit is configured to flush an oldest entry of said buffered history from said buffer portion to said stack portion, and to cause said branch resolution unit to adjust said boundary indication to match.

9. The data processing apparatus as claimed in claim 1, wherein said return address prediction unit is configured to set a resolution marker in association with each entry in said buffered history in said buffer portion, wherein said resolution marker is set if speculative execution of a corresponding instruction for that entry has been determined to be correct.

10. The data processing apparatus as claimed in claim 9, wherein said return address prediction unit is configured, when said speculative execution of said corresponding instruction for that entry has been determined to be correct, and if all older entries in said buffered history have said resolution marker set and if said stack portion is empty, to flush that entry and said older entries from said buffer portion.

11. The data processing apparatus as claimed in claim 1, wherein said return address prediction unit is configured to store a pairing marker in association with each return instruction entry in said buffer portion, said pairing marker indicative of a relative position in said buffer history of a call instruction entry corresponding to said return instruction entry.

12. The data processing apparatus as claimed in claim 11, wherein said pairing marker is a counter, said counter indicative of a number of intervening call instruction entries between said return instruction entry and said call instruction entry.

13. The data processing apparatus as claimed in claim 1, wherein said return address prediction unit is configured, if speculative execution of an instruction corresponding to a selected entry of said buffered history is determined to be incorrect, to clear said selected entry and all younger entries from said buffered history.

14. The data processing apparatus as claimed in claim 2, wherein said return address prediction unit further comprises an architectural return stack portion, said architectural return stack portion configured to maintain an architectural stack of return addresses for resolved call instructions.

15. The data processing apparatus as claimed in claim 14, wherein said return address prediction unit is configured, if said prediction resolution information indicates that speculative execution of said call instruction having said return address in said stack was correct, to update said architectural return stack portion by pushing said return address onto said architectural stack.

16. The data processing apparatus as claimed in claim 3, wherein said return address prediction unit further comprises an architectural return stack portion, said architectural return stack portion configured to maintain an architectural stack of return addresses for resolved call instructions, wherein said return address prediction unit is configured, if said prediction resolution information indicates that speculative execution of an instruction in said first group was incorrect, to copy content of said architectural return stack portion to said stack portion.

17. The data processing apparatus as claimed in claim 16, wherein said return address prediction unit is further configured, if said prediction resolution information indicates that speculative execution of an instruction in said first group was incorrect, to clear said buffered history.

18. A data processing apparatus configured to perform data processing operations in response to an ordered sequence of program instructions, wherein said program instructions comprise call instructions, each said call instruction configured to cause said data processing apparatus to depart from said ordered sequence of program instructions and to execute a further sequence of instructions until a return instruction is encountered and said return instruction configured to cause said data processing apparatus to return to said ordered sequence of program instructions at a return address for said call instruction, said data processing apparatus comprising:

means for executing said program instructions, wherein said means for executing is configured to speculatively execute later program instructions in said ordered sequence in dependence on a predicted outcome of earlier program instructions in said ordered sequence; and means for storing return addresses for unresolved call instructions, and wherein said predicted outcome is dependent on said return addresses, wherein said means for storing return addresses comprises:

means for maintaining a stack of return addresses for said unresolved call instructions, wherein said means for maintaining a stack of return addresses is configured to push said return address for said call instruction onto said stack when said call instruction is speculatively executed and to pop a stacked return address off said stack when said return instruction is speculatively executed; and means for maintaining a buffered history for said unresolved call instructions, wherein said buffered history comprises entries for unresolved call instructions and entries for unresolved return instructions.

19. A method of data processing in a data processing apparatus, the method comprising the steps of:

performing data processing operations in response to an ordered sequence of program instructions, wherein said program instructions comprise call instructions;

in response to each said call instruction, departing from said ordered sequence of program instructions and executing a further sequence of instructions until a return instruction is encountered;

in response to said return instruction, returning to said ordered sequence of program instructions at a return address for said call instruction;

speculatively executing later program instructions in said ordered sequence in dependence on a predicted outcome of earlier program instructions in said ordered sequence; and storing return addresses for unresolved call instructions, and wherein said predicted outcome is dependent on said return addresses, wherein said storing comprises:

maintaining a stack of return addresses for said unresolved call instructions, wherein said stack is maintained by pushing said return address for said call instruction onto said stack when said call instruction is speculatively executed and popping a stacked return address off said stack when said return instruction is speculatively executed; and maintaining a buffered history for said unresolved call instructions, wherein said buffered history comprises entries for unresolved call instructions and entries for unresolved return instructions.

\* \* \* \* \*